(12) United States Patent
Smith

(10) Patent No.: US 7,618,227 B2
(45) Date of Patent: Nov. 17, 2009

(54) METHOD AND APPARATUS FOR AN ADJUSTABLE TRAILER

(75) Inventor: William M. Smith, Kewanee, IL (US)

(73) Assignee: The Advance Metal Working Company, Inc., Kewanee, IL (US)

( * ) Notice: Subject to any disclaimer, the term of this patent is extended or adjusted under 35 U.S.C. 154(b) by 218 days.

(21) Appl. No.: 10/675,878

(22) Filed: Sep. 30, 2003

(65) Prior Publication Data
US 2005/0067799 A1    Mar. 31, 2005

(51) Int. Cl.
B60P 1/08    (2006.01)
(52) U.S. Cl. .................. 414/484; 414/474; 414/476; 280/43.13; 280/43.23; 280/414.5
(58) Field of Classification Search .......... 414/474, 414/483, 484, 485, 476, 482; 280/64, 43.13, 280/43.17, 43.23, 43.24, 414.5
See application file for complete search history.

(56) References Cited

U.S. PATENT DOCUMENTS

| 2,990,966 | A | * | 7/1961 | Schramm .................... 414/476 |
| 3,012,682 | A | * | 12/1961 | Williamson ................. 414/476 |
| 3,180,510 | A | | 4/1965 | Moller |
| 4,030,738 | A | | 6/1977 | Willetts |
| 4,030,777 | A | | 6/1977 | Rabenseifner |
| 4,061,353 | A | | 12/1977 | Kingman et al. |
| 4,089,544 | A | | 5/1978 | Raidel |
| 4,132,433 | A | | 1/1979 | Willetts |
| 4,201,273 | A | | 5/1980 | Joyce, Jr. |
| 4,279,319 | A | | 7/1981 | Joyce, Jr. |
| 4,317,593 | A | | 3/1982 | Sarvela |
| 4,372,572 | A | | 2/1983 | Verschage |
| 4,493,491 | A | | 1/1985 | Karlik |
| 4,652,196 | A | | 3/1987 | Woerman |
| 4,685,855 | A | | 8/1987 | Celli |
| 4,702,662 | A | | 10/1987 | Marlett |
| 4,717,170 | A | | 1/1988 | Mounier-Poulat et al. |
| 4,858,898 | A | | 8/1989 | Niikura et al. |

(Continued)

OTHER PUBLICATIONS

Definition of actuator,"The Free Dictionary by Farlex", www.thefreedictionary.com/actuator.*

Primary Examiner—Michael S Lowe
(74) Attorney, Agent, or Firm—Hamilton IP Law, PC; Jay R. Hamilton; Charles A. Damschen

(57) ABSTRACT

A trailer having a front and a rear. The trailer includes a frame constructed to receive a bed and a hitch attached to the frame at the front of the trailer. A tube is pivotally connected to the frame between the front and the rear of the trailer. First and second support arms are connected to the tube. Each wheel support arm has an axle and a wheel located at its distal end. The trailer further includes means for rotating the tube. In one embodiment, the trailer has an inclining feature and a shoe for ground engagement. The shoe is located vertically below a central axis of the tube and longitudinally between the wheels and the front of the trailer. In a second embodiment, the trailer has an inclining and elevating feature. In this second embodiment, the hitch is pivotally connected to the front of the trailer and there is provided means for rotating the tube and rotating the hitch relative to one another to elevate, incline, or decline the bed.

10 Claims, 18 Drawing Sheets

U.S. PATENT DOCUMENTS

| | | |
|---|---|---|
| 4,900,055 A | 2/1990 | Wright |
| 4,943,078 A | 7/1990 | McGhie et al. |
| 5,013,056 A | 5/1991 | Landoll et al. |
| 5,112,182 A | 5/1992 | Nuttall |
| 5,161,814 A * | 11/1992 | Walker .................... 280/414.5 |
| 5,288,197 A | 2/1994 | Harris |
| 5,375,866 A | 12/1994 | Wagner |
| 5,536,131 A | 7/1996 | Behr |
| 5,775,868 A | 7/1998 | Mann |
| 5,967,733 A * | 10/1999 | Cash .......................... 414/483 |
| 6,135,700 A * | 10/2000 | Collins ....................... 414/476 |
| 6,217,010 B1 | 4/2001 | McNeely |
| 6,220,613 B1 | 4/2001 | Franzini |
| 6,250,658 B1 | 6/2001 | Sakai |
| 6,382,647 B1 | 5/2002 | Smith |
| 6,447,237 B1 | 9/2002 | Haynes |
| 6,520,521 B2 | 2/2003 | Mayfield |
| 6,592,139 B1 | 7/2003 | Shanahan |

* cited by examiner

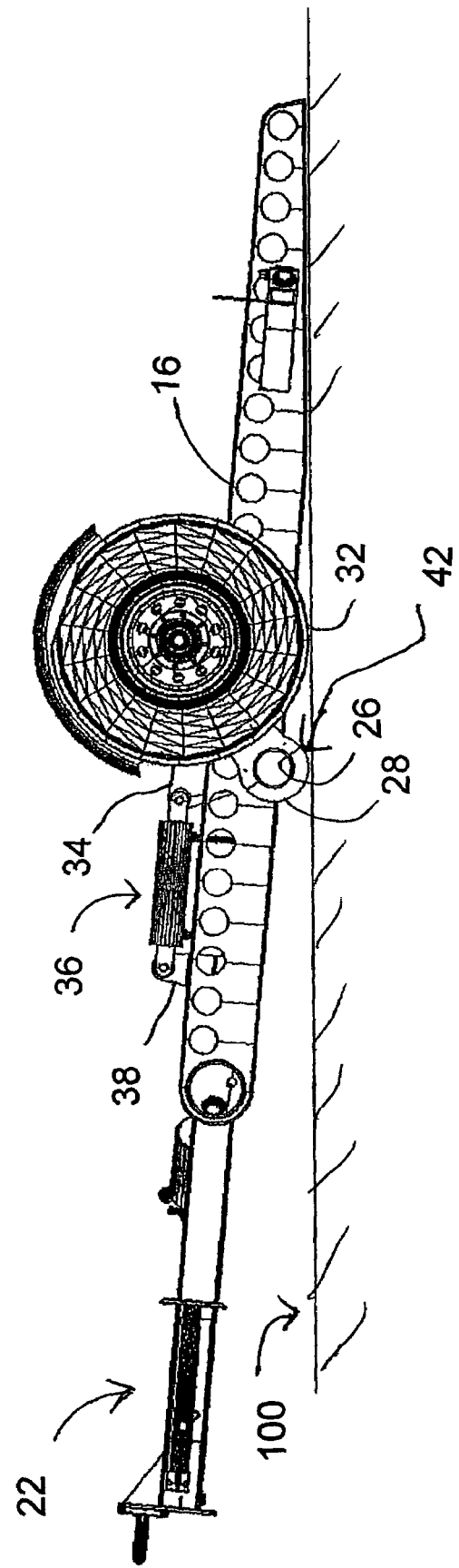

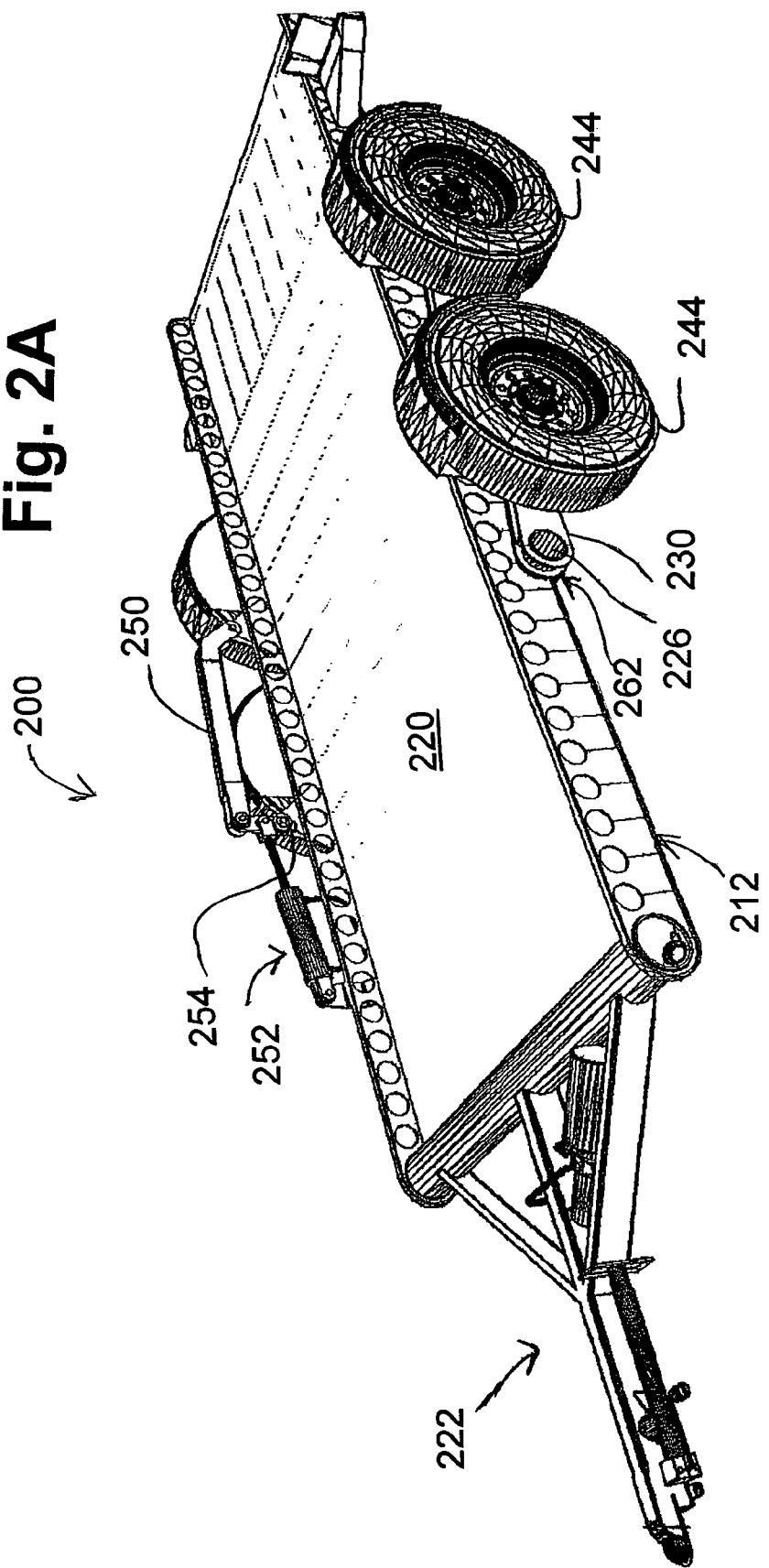

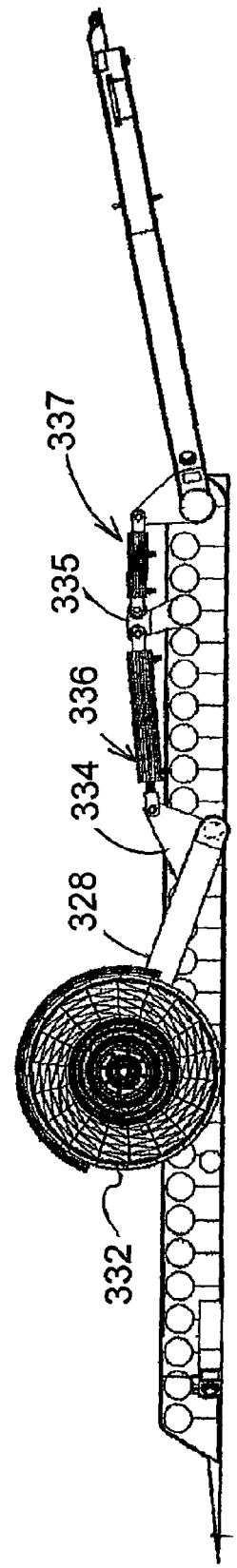

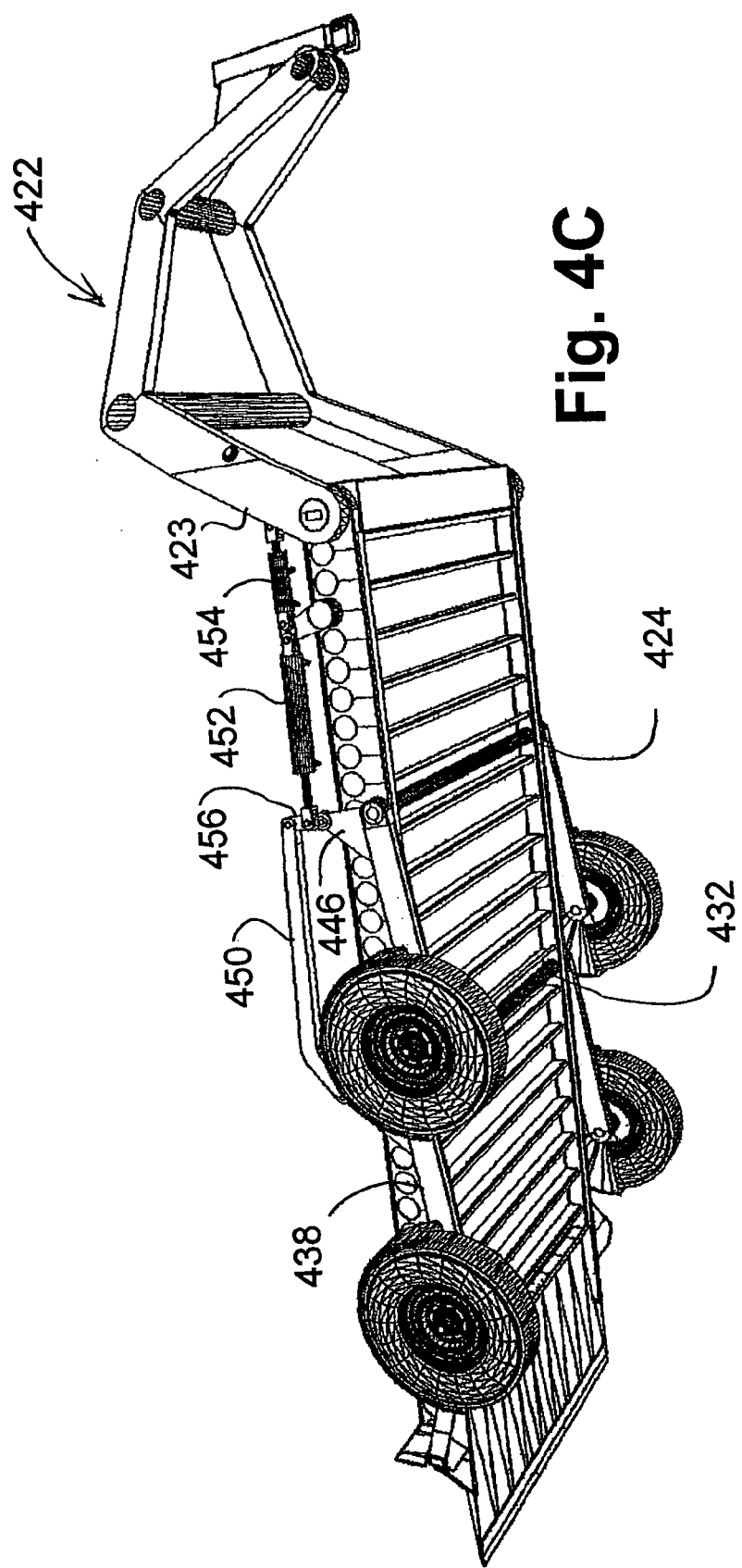

METHOD AND APPARATUS FOR AN ADJUSTABLE TRAILER

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to utility trailers and, more particularly, to an inclining and/or elevating trailer.

2. Related Art

The utility of a transport trailer is well known. However, there has long been a problem in loading a utility trailer. Often times one would prefer to have a trailer low to the ground for easy loading but raised significantly above the ground for highway transportation. Moreover, there has been a long felt need for a utility trailer that is capable of inclining and/or declining. The functionality of inclining and/or declining allows for loading or unloading of the trailer.

U.S. Pat. No. 3,180,510 to Mollar discloses a trailer for hauling a golf buggy. The trailer raises and lowers for loading and unloading a golf cart. It is actually the rear end of the trailer which tilts in response to hydraulic actuating cylinders. The tilting or movement of the trailer is accomplished by retracting its two wheels. Moller discloses anchoring means to prevent any movement or shifting of the trailer. However, the anchoring means disclosed by Moller cannot be applied quickly or easily.

U.S. Pat. No. 4,317,593 to Sarvela discloses a high lift dump trailer having a pair of retractable members. The pair of retractable members stabilize the trailer when the body of the trailer is at an elevated level. The retractable members disclosed by Sarvela are hydraulically operated and, thus, expensive. Further, the retractable members are at a disadvantageous location.

U.S. Pat. No. 4,685,855 to Celli discloses an inclining and elevating trailer. The trailer includes a frame, a load carrying bed, and link members which form a parallelogram. The link members allow the load carrying bed to be raised from a ground loading position to a co-planar transport position. The link members can also be arranged to incline the load carrying bed. However, the link members have a fixed length. Hence, the trailer has a very limited amount of adjustment. Additionally, the load carrying bed pivots at an extreme rear of the trailer. This requires the load be placed on the trailer at a steep angle.

There remains a need in the art for a utility trailer that can incline to enable easier loading. Additionally, there remains a need in the art for a utility trailer that can incline and elevate. There also remains a need in the art for an inclining utility trailer having supports that engage the ground and stabilize the trailer. Finally, there remains a need in the art for an apparatus to inform a user about load conditions, such as load balance.

SUMMARY OF THE INVENTION

It is in view of the above problems that the present invention was developed. The invention is an inclining trailer having a front and a rear. The trailer includes a frame constructed to receive a bed and a hitch attached to the frame at the front of the trailer. A tube is pivotally connected to the frame between the front and the rear of the trailer. Left and right wheel support arms are connected to the tube. Each wheel support arm has an axle and a wheel located at its distal end. The trailer further includes means for rotating the tube and a shoe for ground engagement. The shoe engages the ground thereby providing a mid-trailer load bearing point that reduces the dynamic forces to which the trailer is subjected. The shoe is located below the trailer frame and longitudinally between the wheels and the front of the trailer.

In another aspect of the invention, there is an inclining and elevating trailer having a front and a rear. The trailer includes a frame constructed to receive a bed. A hitch is pivotally attached to the frame at the front of the trailer. A tube is pivotally connected to the frame between the front and the rear of the trailer. Left and right wheel support arms are connected to the tube. Each wheel support arm has an axle and a wheel located at its distal end. The trailer further includes means for rotating the tube and rotating the hitch relative to one another to elevate, incline, or decline the bed. The tube and hitch can be rotated at various degrees, hence the trailer is adjustable.

In yet another aspect of the invention, there is an inclining and elevating trailer having a front pressure sensor and a rear pressure sensor. The pressure sensors are connected to a management controller. Based on pressure signals from the pressure sensors, the management controller can indicate whether the trailer is loaded equally front-to-rear or whether the trailer is overloaded. Optionally, the management controller may prevent trailer operation if the trailer is overloaded.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 1C is a side view of a first embodiment of an inclining trailer in a loading position;

FIG. 2A is a perspective view of a second embodiment of the inclining trailer in a transport position;

FIG. 3C is a side view of a first embodiment of an inclining and elevating trailer in a loading position;

FIG. 4C is a perspective view of a second embodiment of an inclining and elevating trailer in a transport position;

DETAILED DESCRIPTION OF THE PREFERRED EMBODIMENTS

Figure 1A:
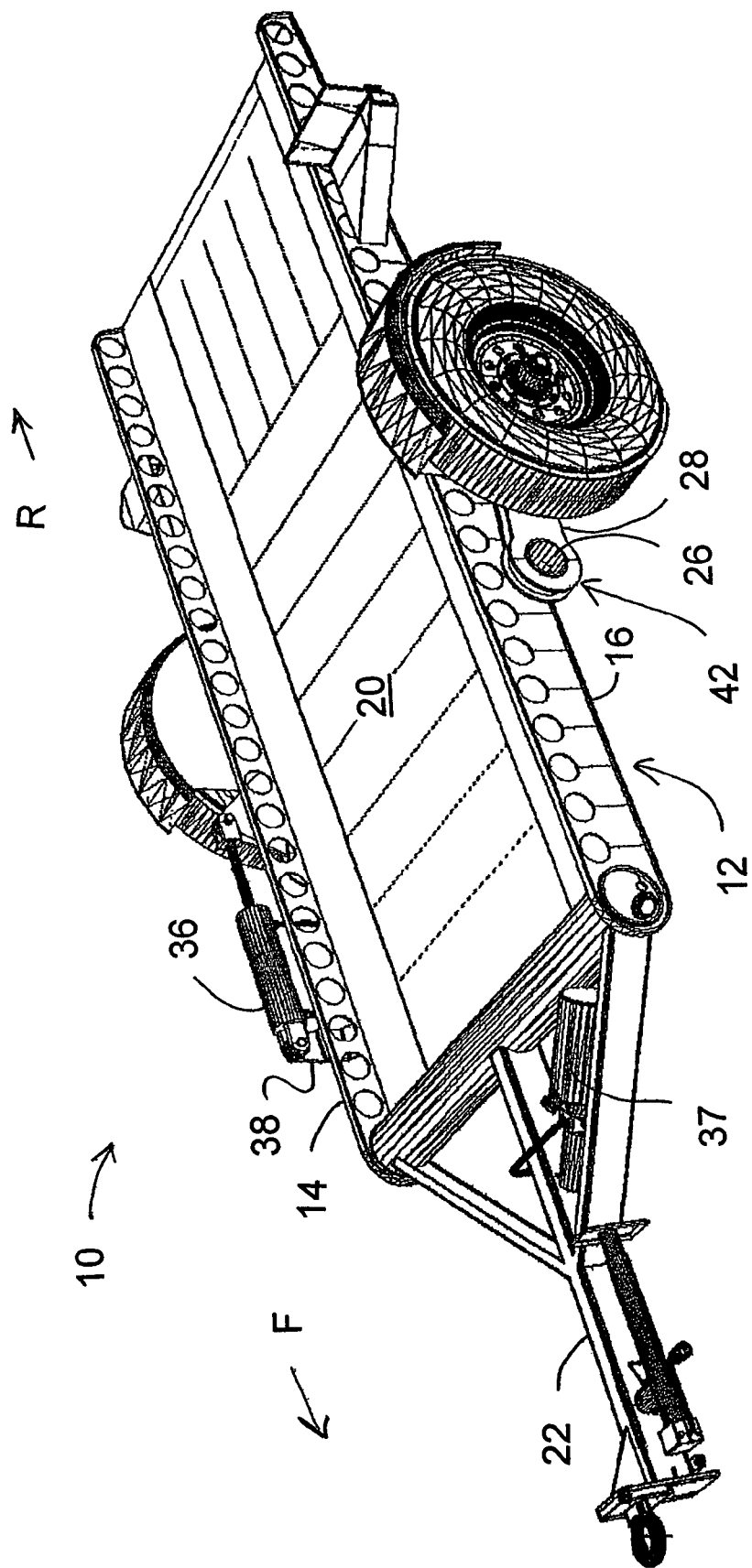
FIG. 1A is a perspective view of a first embodiment of an inclining trailer in a transport position.
Figure 1B:
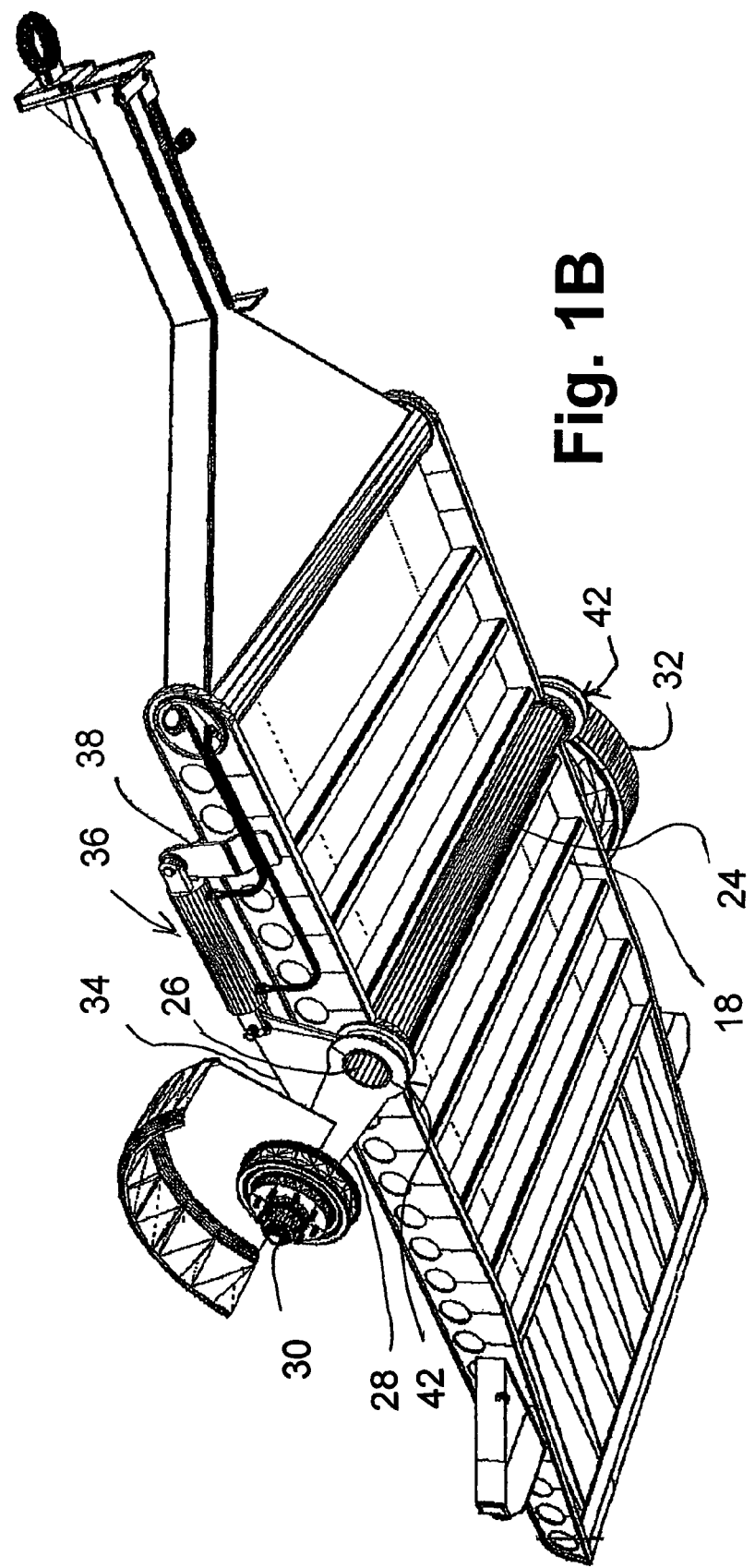
FIG. 1B is a perspective view of a first embodiment of an inclining trailer in a loading position.

Referring to the accompanying drawings in which like reference numbers indicate like elements, FIGS. 1A-1C illustrate an inclining trailer 10 having a front F and a rear R. The inclining trailer has a frame 12. The frame 12 includes a first side member 14, a second side member 16, and cross-members 18. The frame 12 is constructed to receive a bed 20. A hitch 22 is attached to the frame 12 at the front F of the trailer 10. While in the depicted embodiment the hitch 22 is a tongue-type hitch, those skilled in the art will understand that the hitch 22 could also be a gooseneck-type hitch.

A tube 24 is pivotally attached to the frame 12. While in the depicted embodiment the tube 24 is a tube having an inner diameter and an outer diameter, those skilled in the art will understand that the tube 24 is simply a rotating member which could be replaced by a solid member having only an outer diameter, such as a pin. The tube 24 has ends 26. A wheel support arm 28 is operatively connected to each end of the tube 24. Each wheel support arm 28 includes an axle 30. A wheel 32 is rotatably connected to each axle 30. A first bracket 34 is operatively connected to one of the wheel support arms 28. A power actuator 36, such as a hydraulic cylinder, is operatively connected to the first bracket 34. While a hydraulic cylinder is shown in the depicted embodiment, those skilled in the art will understand that other types of power actuators may be used. For example, the power actuator 36 could also be a pneumatic cylinder or a linear drive motor. The power actuator 36 is supported by a second bracket 38 attached to the frame 12. The power actuator 36 acts on the first bracket 34 thereby causing wheel support arms 28 and the tube 24 to rotate. In some embodiments, a power supply 37 is operatively attached to the frame 12. In the depicted embodiment, actuating the power actuator 36 inclines the trailer 10 and depressurizing the power actuator 36 declines the trailer 10 through the assistance of gravity. The power supply 37 provides the motivation for the power actuator 36. For example, the power supply 37 may be a hydraulic pump for supplying hydraulic pressure.

The inclining trailer 10 also includes a shoe 40 for stabilizing ground engagement during loading. The shoe 40 engages the ground thereby broadening the base of the trailer 10. By broadening the base of the trailer 10, the dynamic effects of loading the trailer are significantly reduced. The shoe 40 is located in a longitudinally intermediate position between the front of the trailer 10 and the wheels 32. In a first embodiment, the shoe 40 is integral with at least one of the wheel support arms 28. FIGS. 1A-1C illustrate the first embodiment wherein the wheel support arms 28 each have an enlarged shoulder 42. When the power actuator 36 rotates the wheel support arms 28 and the tube 24, the shoulder 42 is brought into contact with the ground 100. In a variation of this example, the tube 24 includes a ridge (not shown) such that when the tube 24 is rotated, the ridge is brought into contact with the ground.

Figure 1D:
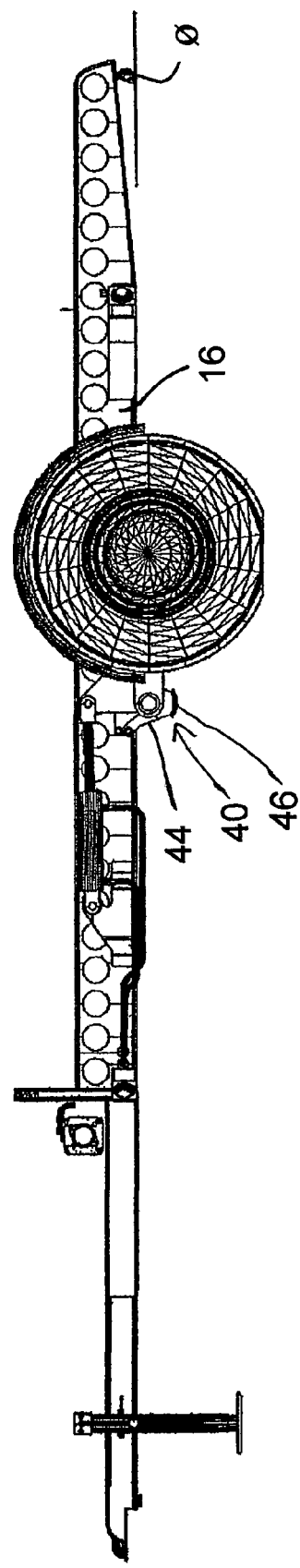
FIG. 1D is a side view of an alternative embodiment of an inclining trailer in a transport position.

In a second embodiment, the shoe 40 is operatively connected to the frame 12. FIG. 1D illustrates the shoe 40 bolted to the second side member 16. Although FIG. 1D shows the shoe 40 attached to the second side member 16, it could also be bolted to the first side member 14. Alternatively, the shoe 40 could be bolted to the first and second side members 14, 16. While in the depicted embodiment the shoe 40 is shown as being bolted, those skilled in the art will understand that shoe 40 could be attached by other means, such as welding, or integrated into one or both of the side members 14, 16. The shoe 40 includes post 44 and support plate 46. The proximate end of the post 44 is operatively connected to the tube 24 and the distal end of the post 44 is operatively connected to the support plate 46. The support plate 46 engages the ground 100. While only one shoe 40 is shown in this second embodiment, those skilled in the art will understand that more than one shoe can be used. For example, the trailer 10 may include one shoe on each end of the tube 24 or multiple intermediate shoes.

A portion of the frame 12 and the bed 20 form what is known in the art as a "reverse beaver tail." In other words, the rear R of the trailer 10 is inclined at an angle $\theta$. In the depicted embodiment the angle $\theta$ is equal to five degrees (5°); however, other angles may be used. In the depicted embodiment, the angle $\theta$ is equal to the maximum incline of the trailer 10.

Figure 2B:
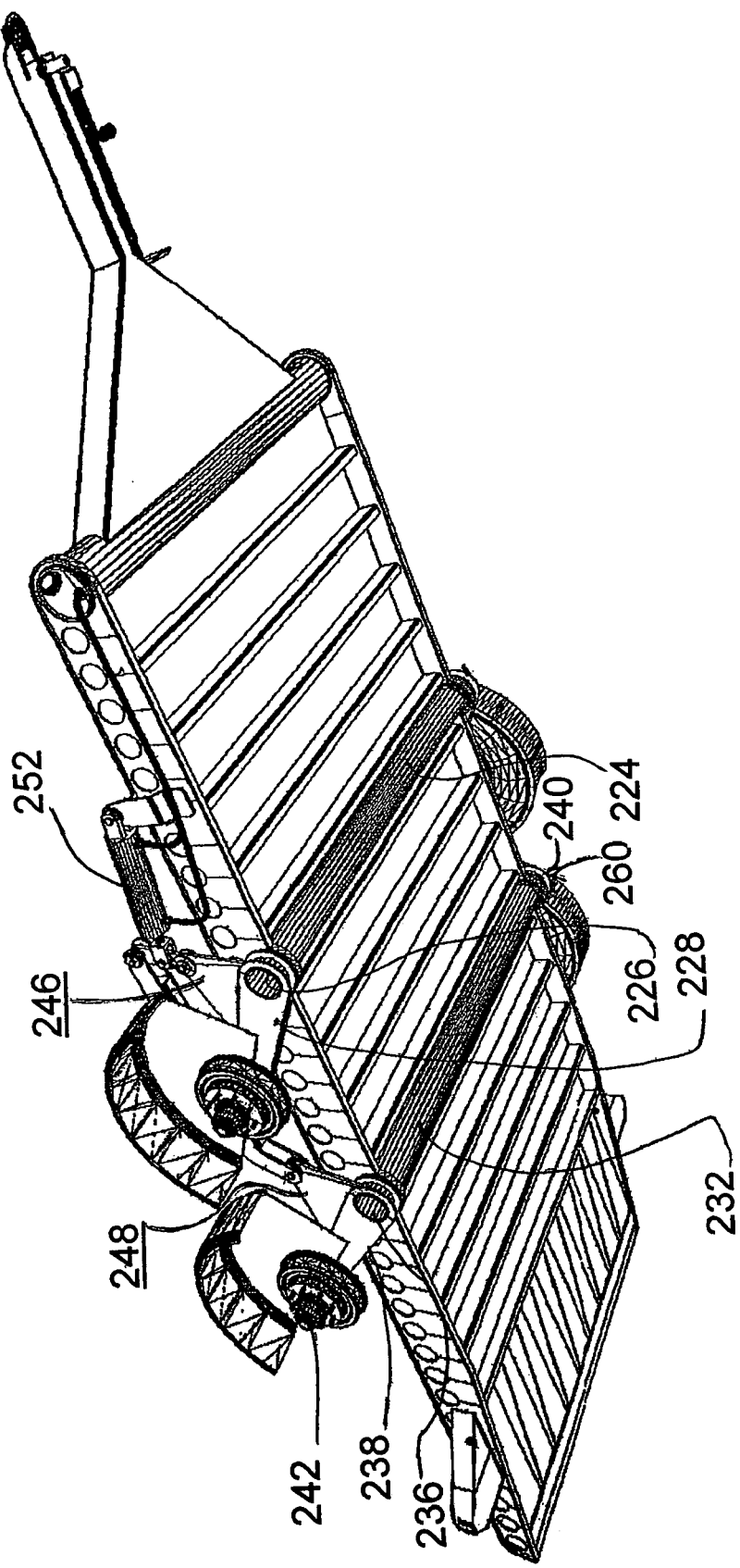
FIG. 2B is a perspective view of a second embodiment of the inclining trailer in a loading position.

FIGS. 2A and 2B illustrate a second embodiment of the inclining trailer, generally indicated by numeral reference 200. The inclining trailer includes a frame 212, a bed 220, and a hitch 222 as substantially described above.

A first tube 224 is pivotally connected to the frame 212. The first tube 224 has ends 226 with a first and a second wheel support arm 228, 230 operatively mounted on each end. The inclining trailer 200 further includes a second tube 232 pivotally connected to the frame 212. The second tube 234 has ends 236 with a third and a fourth wheel support arm 238, 240 operatively mounted on each end. In some embodiments, the inclining trailer 200 may include yet another tube and corresponding pair of wheel support arms (not shown). An axle 242 and a wheel 244 are located at the distal end of each wheel support arm.

A first bracket 246 is operatively connected to one of the wheel support arms 228, 230. A second bracket 248 is operatively connected to one of the other wheel support arms 238, 240. A first walking beam 254 is operatively connected to the first bracket 246. A connecting link 250 operatively connects the first walking beam 254 and to the second bracket 248. A walking beam is a load equalization device. The inclining trailer 200 may include additional walking beams corresponding to the additional number of tubes. A power actuator 252, such as a hydraulic cylinder, is operatively connected to the walking beam 254. In the depicted embodiment, the walking beam 254 interconnects the first bracket 246, the connecting link 250, and the power actuator 252.

The inclining trailer further includes a shoe 260 as substantially described above. In the depicted embodiment, the shoe 260 is an enlarged shoulder 262 incorporated into third and fourth wheel support arms 238, 240.

Figure 3A:
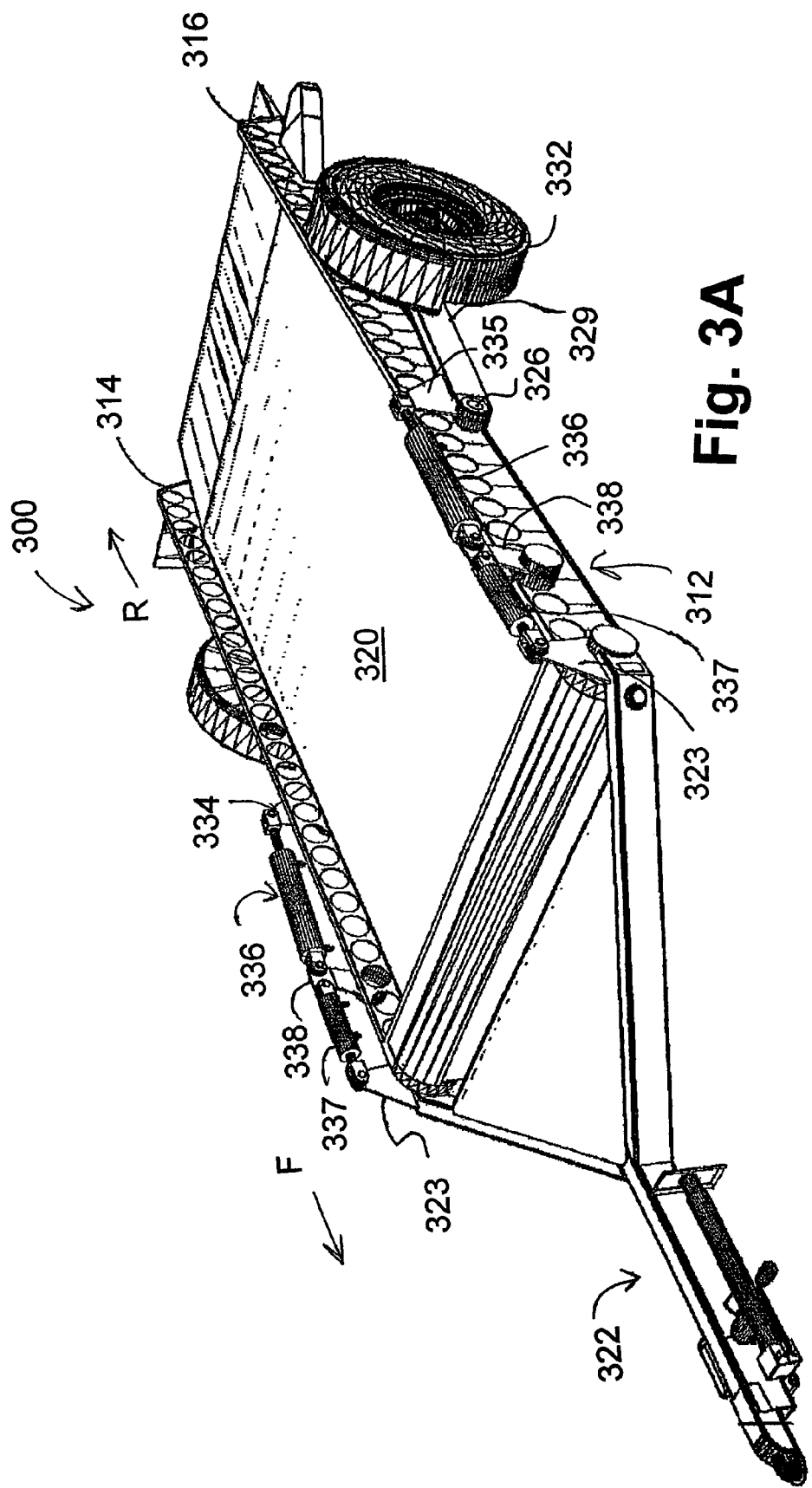
FIG. 3A is a perspective view of a first embodiment of an inclining and elevating trailer in a transport position.
Figure 3B:
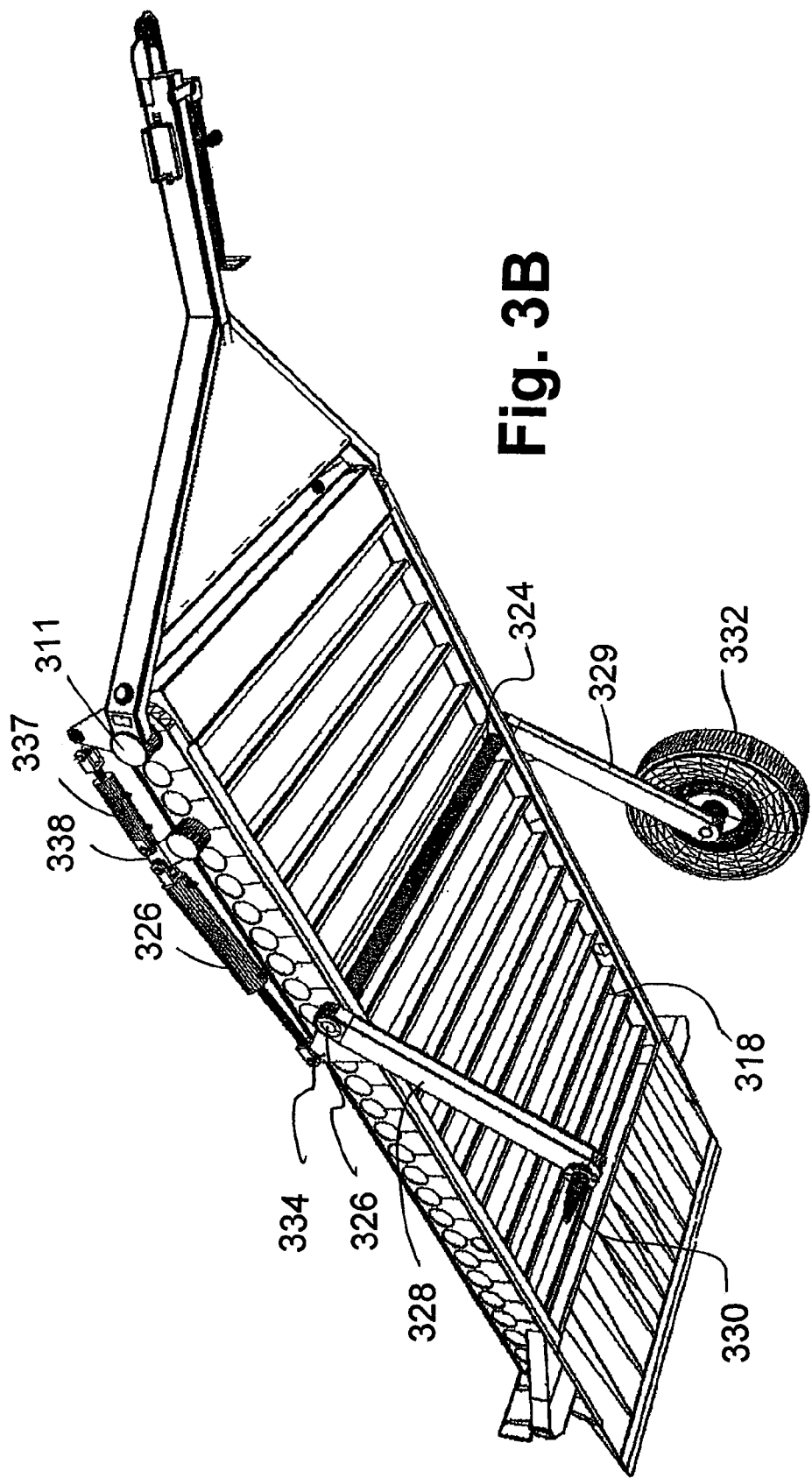
FIG. 3B is a perspective view of a first embodiment of an inclining and elevating trailer in an elevated position.
Figure 4A:
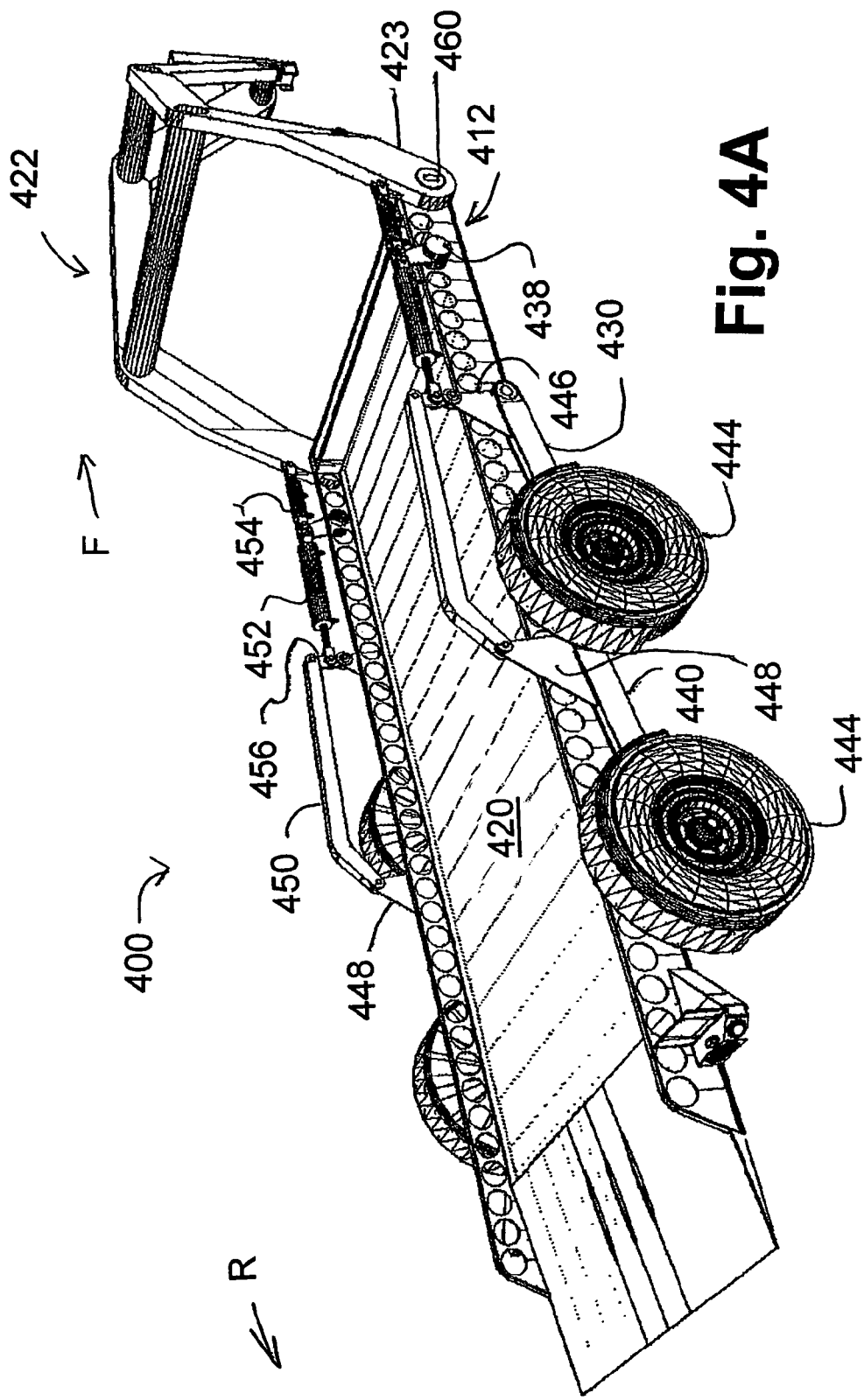
FIG. 4A is a perspective view of a second embodiment of an inclining and elevating trailer in a transport position.
Figure 4B:
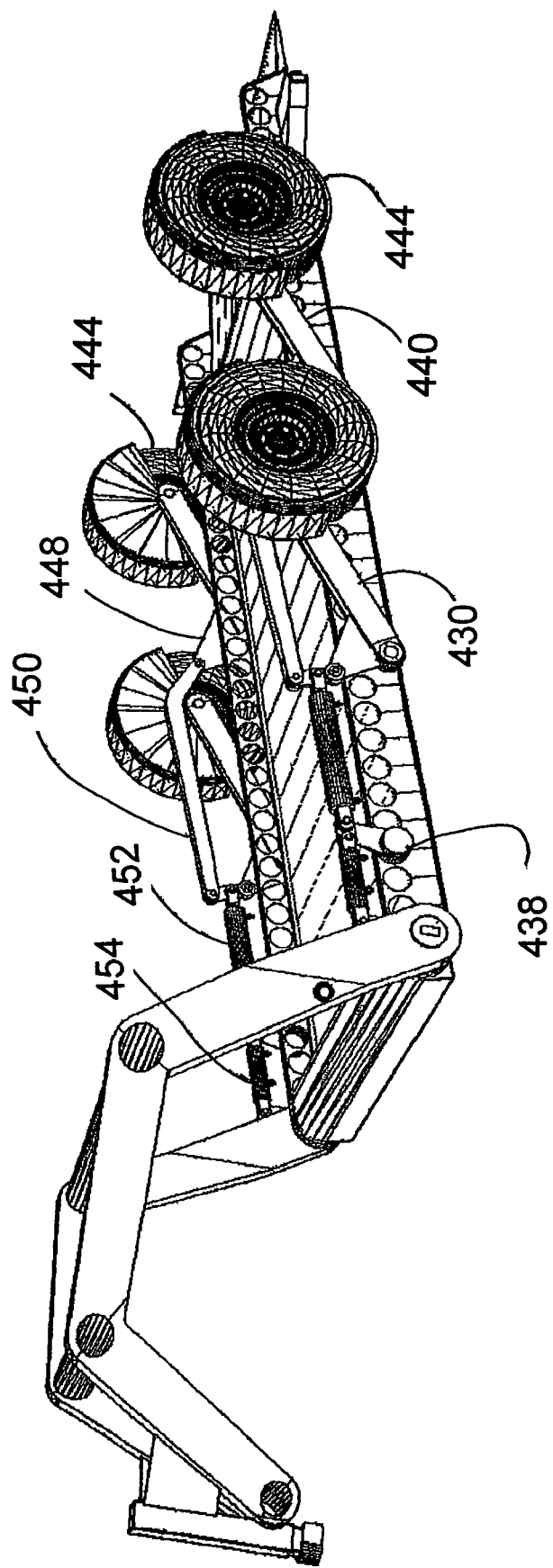
FIG. 4B is a perspective view of a second embodiment of an inclining and elevating trailer in a loading position.

FIGS. 3A-3C illustrate an inclining and elevating trailer 300 having a front F and a rear R. The inclining and elevating trailer has a frame 312. The frame 312 includes a first side member 314, a second side member 316, and cross-members 318. The frame 312 is constructed to receive a bed 320. A hitch 322 is rotatably attached to the frame 312 at pivot 311 at the front F of the trailer 300. While in the depicted embodiment the hitch 322 is a tongue-type hitch, those skilled in the art will understand that the hitch 322 could also be a gooseneck-type hitch. The hitch 322 includes connecting flanges 323.

A tube 324 is pivotally attached to the frame 312. The tube 324 has ends 326. A first wheel support arm 328 is operatively connected to one end of the tube 324 and a second wheel support arm 329 is connected to the other end. Each wheel support arm 328, 329 includes an axle 330. A wheel 332 is rotatably connected to each axle 330. A first bracket 334 is operatively connected to the first wheel support arm 328 and a second wheel support bracket 335 is operatively connected to the second wheel support arm 329. First pair of power actuators 336, such as hydraulic cylinders, are operatively connected to the first bracket 334 and the second bracket 335. Second pair of power actuators 337 are operatively connected to the connecting flanges 323. While a hydraulic cylinder is shown in the depicted embodiment, those skilled in the art will understand that other types of power actuators may be used. For example, the power actuator could also be a pneumatic cylinder or a linear drive motor.

Each power actuator 336 is supported by mounting brackets 338 attached to the frame 312. The first pair of power actuators 336 acts on the first and second bracket 334, 335 thereby causing wheel support arms 328 and the tube 324 to rotate. The second pair of power actuators 337 acts on the connecting flanges 323, thereby rotating the hitch 322. By coordinating the rotation of the tube 324 and the hitch 322, the trailer 300 can be inclined, declined, elevated, or any combination thereof. For example, actuation of only the second pair of power actuators 337 will incline the trailer 300. In contrast, actuation of only the first pair of power actuators 336 will decline the trailer 300. Further, actuation of both the first and second pair of actuators 336, 337 will elevate the trailer. In contrast, depressurization of both the first and second actuators 336, 337 will lower the trailer 300. In the depicted embodiments, the power actuators 336, 337 incline and elevate the trailer 300 and the trailer 300 declines and de-elevates through the assistance of gravity.

In an alternative embodiment, first pair of power actuators 336 are double acting. In this alternative embodiment, second pair of power actuators 337 are replaced with a solid link, such as a tube or bar. Additionally, mounting brackets 338 are pivotable. This alternative embodiment has some advantages, but also some disadvantages. This embodiment has fewer moving parts providing an economic advantage. However, this embodiment does not allow for smooth elevation of the trailer 300.

FIGS. 4A-4D illustrate a dual axle inclining and elevating trailer 400 having a front F and a rear R. The inclining and elevating trailer 400 has a frame 412. The frame 412 is constructed to receive a bed 420. A hitch 422 is pivotally attached to the frame 412 at the front F of the trailer 400. While in the depicted embodiment the hitch 422 is a gooseneck-type hitch, those skilled in the art will understand that the hitch 422 could also be a tongue-type hitch. The hitch 422 includes connecting flanges 423.

A first tube 424 is pivotally connected to the frame 412. The first tube 424 has ends 426 with a first and a second wheel support arm 428, 430 operatively mounted on each end. The inclining and elevating trailer 400 further includes a second tube 432 pivotally connected to the frame 412. The second tube 434 has ends 436 with a third and a fourth wheel support arm 438, 440 operatively mounted on each end. In some embodiments, the inclining and elevating trailer 400 may include yet another tube and corresponding pair of wheel support arms. An axle 442 and a wheel 444 are located at the distal end of each wheel support arm.

First pair of brackets 446 are operatively connected to the first and second wheel support arms 428, 430. Second pair of brackets 448 are operatively connected to the third and fourth wheel support arms 440. First walking beams 456 are operatively connected to the first pair of brackets 446. Connecting links 450 operatively connects the first walking beams 456 and the second pair of brackets 448.

In an embodiment with a third tube and pair of wheels, a first pair of power actuators 452, for example hydraulic cylinders, are operatively connected to the first walking beams 456. The connecting link would connect to a second walking beam linked with both bracket 448 and a final connecting link to the third axle set (not shown). While a hydraulic cylinder is shown in the depicted embodiment, Those skilled in The art will understand that other types of power actuators may be used. For example, The power actuator could also be a pneumatic cylinder or a linear drive motor. Second pair of power actuators 454 is operatively connected to the connecting flanges 423 which form the arms of the gooseneck. The power actuators 452, 454 are supported by mounting brackets 438 attached to the frame 412. The first pair of power actuators 452 acts on the first pair of brackets 446 thereby causing wheel support arms 428, 430, 440 and the tubes 424, 432 to rotate. The second pair of power actuators 454 acts on the connecting flanges 423, thereby rotating the hitch 422. By coordinating the rotation of the tubes 424, 432 and the hitch 422 at pivot point 460, the trailer 400 can be inclined, declined, elevated, or any combination thereof. For example, actuation of only the second pair of power actuators 454 will incline the trailer 400. In contrast, actuation of only the first pair of power actuators 452 will decline the trailer 400. Further, actuation of both the first and second pair of actuators 452, 454 will elevate the trailer 400. In contrast, depressurization of both the first and second actuators 452, 454 will lower the trailer 400. In the depicted embodiments, actuating the power actuators 452, 454 inclines and elevates the trailer 400 and depressurizing the power actuators 452, 454 declines and de-elevates the trailer 400 through the assistance of gravity.

Figure 5:
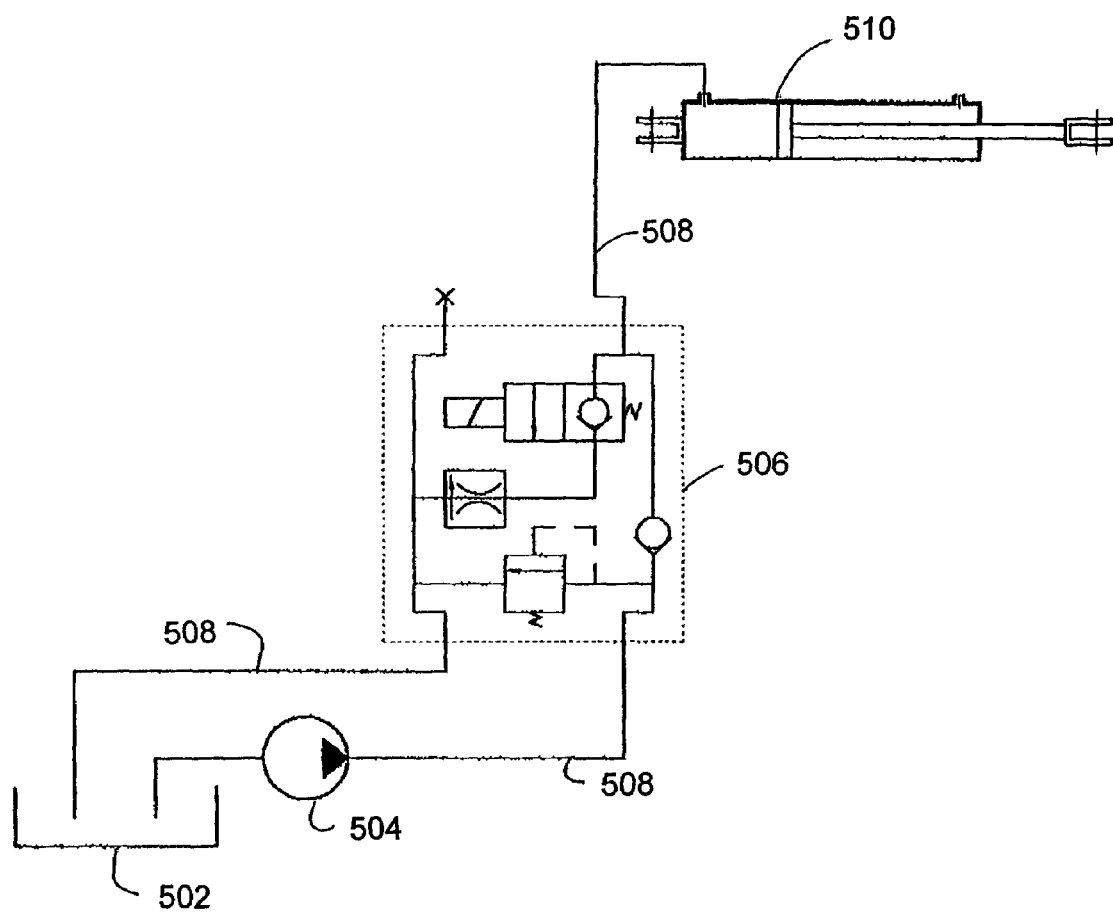
FIG. 5 is a hydraulic schematic for the inclining trailer.

FIG. 5 is a hydraulic schematic of the inclining trailer embodiment shown in FIGS. 1A-1D and 2A-2B. The schematic illustrates a reservoir 502, a pump 504, a multi-function valve 506, a hydraulic line 508, and a hydraulic actuator 510. The pump 504 supplies line pressure to the multi-function valve 506. The multi-function valve 506 selectively pressurizes one side of the hydraulic actuator 510. In the depicted embodiment, only one side of the hydraulic actuator 510 is pressurized and the other side is open to the atmosphere. In some embodiments, the side open to the atmosphere optionally includes a filter (not shown).

Figure 6:
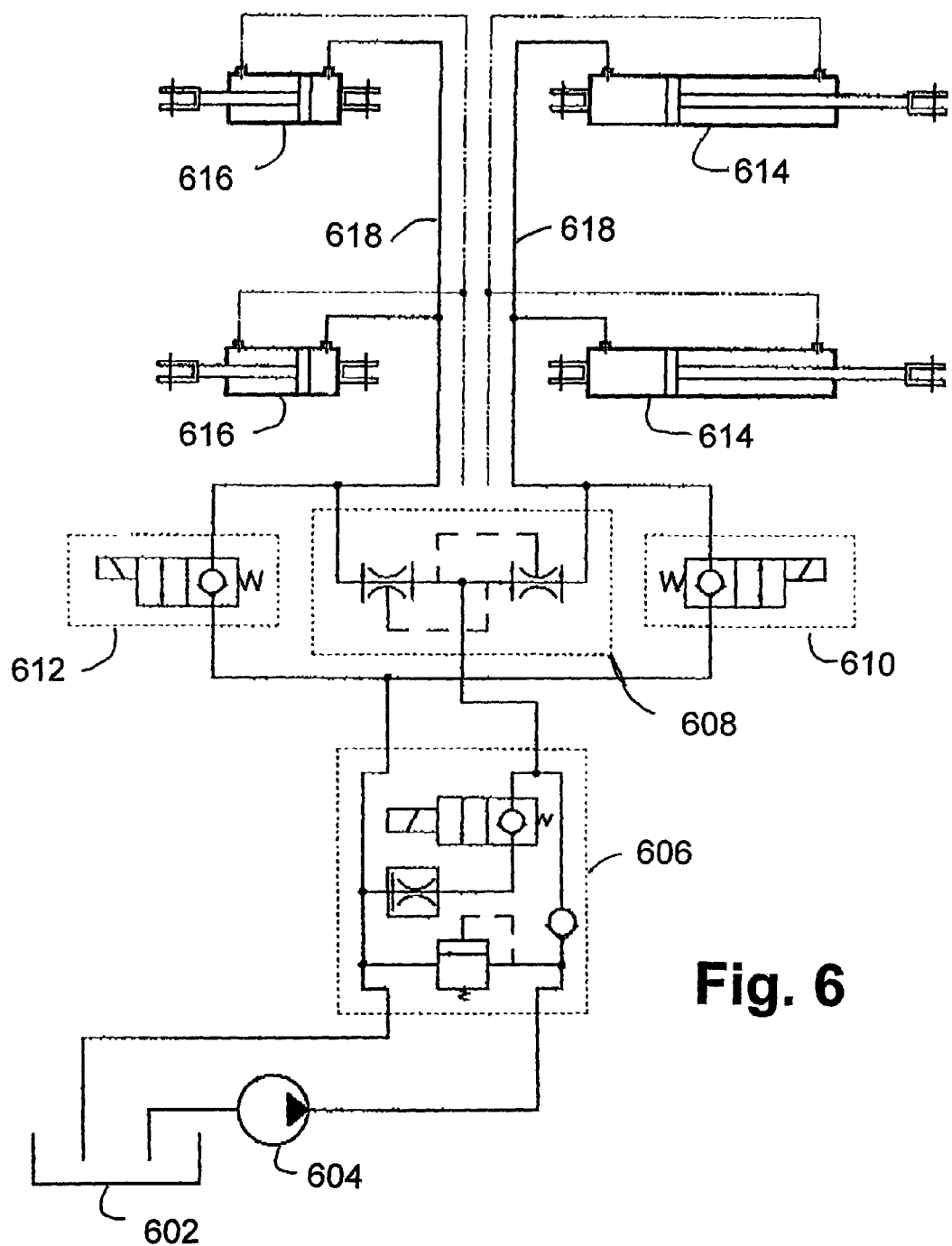
FIG. 6 is a hydraulic schematic for the inclining and elevating trailer.

FIG. 6 is a hydraulic schematic of the inclining and elevating trailer embodiment shown in FIGS. 3A-3C and 4A-4C. The schematic illustrates a reservoir 602, a pump 604, a control valve 606, a divider/combiner valve 608, an inclining valve 610, and a declining valve 612. The valves 606, 608, 610, 612 selectively control a first pair of hydraulic actuators 614 and a second pair of hydraulic actuators 616. The first pair of hydraulic actuators 614 correspond to actuators 336 in FIGS. 3A-3C and actuators 452 in FIGS. 4A-4C. The second pair of hydraulic actuators 616 correspond to actuators 337 in FIGS. 3A-3C and actuators 454 in FIGS. 4A-4C. The divider/combiner valve 608 divides hydraulic pressure between the actuators 614, 616 according to a specified ratio. For example, the ratio may be 50/50, 60/40, 70/30, or variations thereof. The schematic further illustrates lines 618 which operatively connect the components.

Figure 7A:
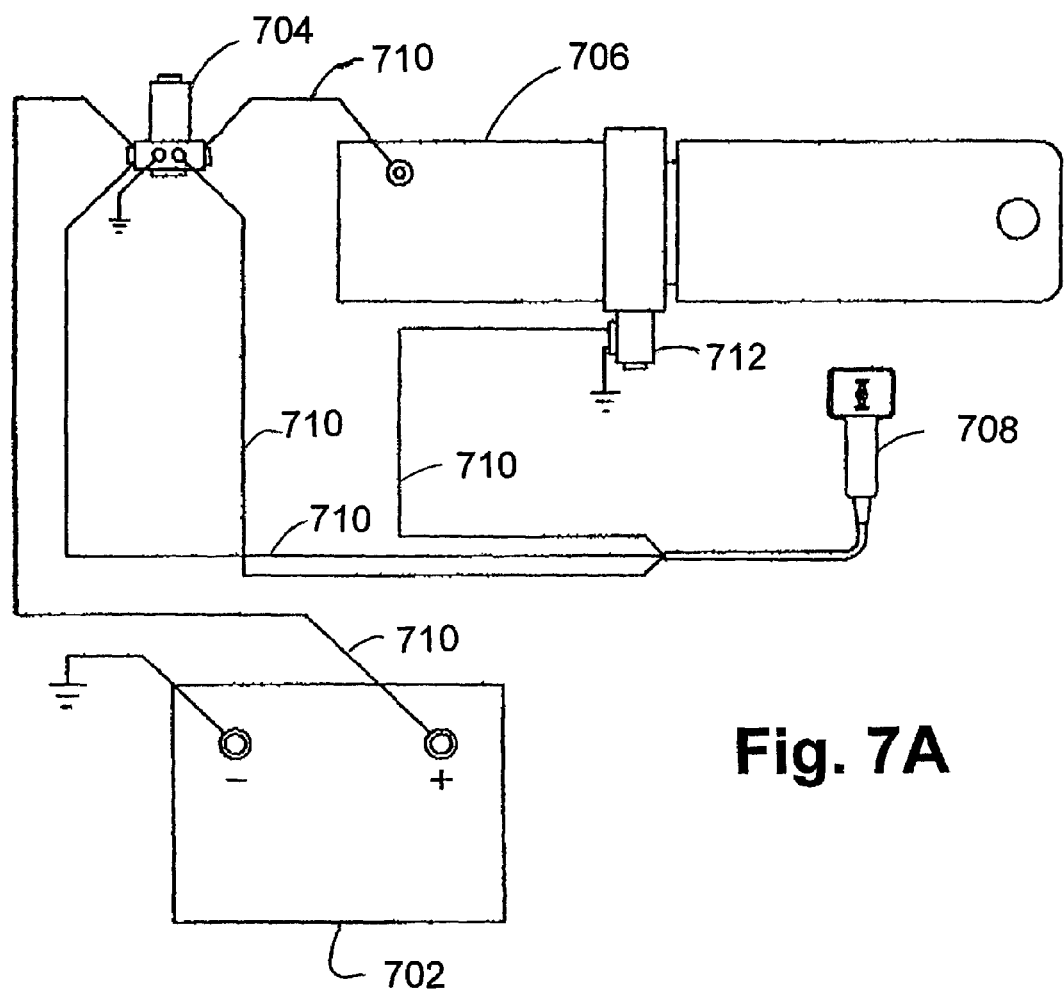
FIG. 7A is an electrical diagram for the inclining trailer.

FIG. 7A illustrates an electrical diagram for the inclining trailer. The diagram illustrates a battery 702, a solenoid 712, a hydraulic pump and motor assembly 706 which may correspond to any of the hydraulic pumps depicted in FIGS. 1A and 2A, a motor relay 704, and a control 708. The components are operatively connected by wires 710.

Figure 7B:
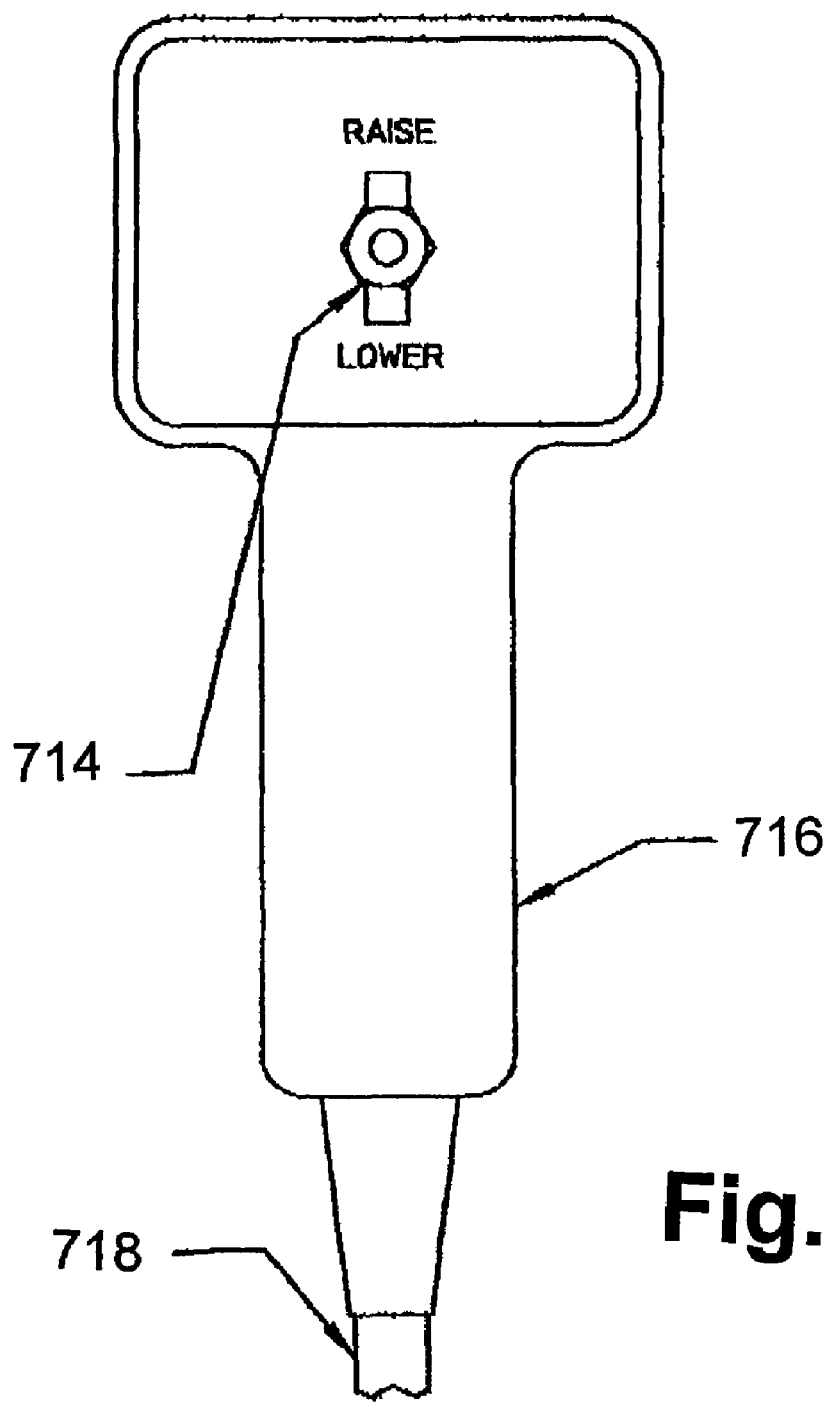
FIG. 7B is a detailed view of the control shown in FIG. 7A.

FIG. 7B provides a detailed view of the control 708. The control includes a switch 714, a handle 716, and a harness 718. The harness 718 covers a portion of the wires 710.

Figure 8A:
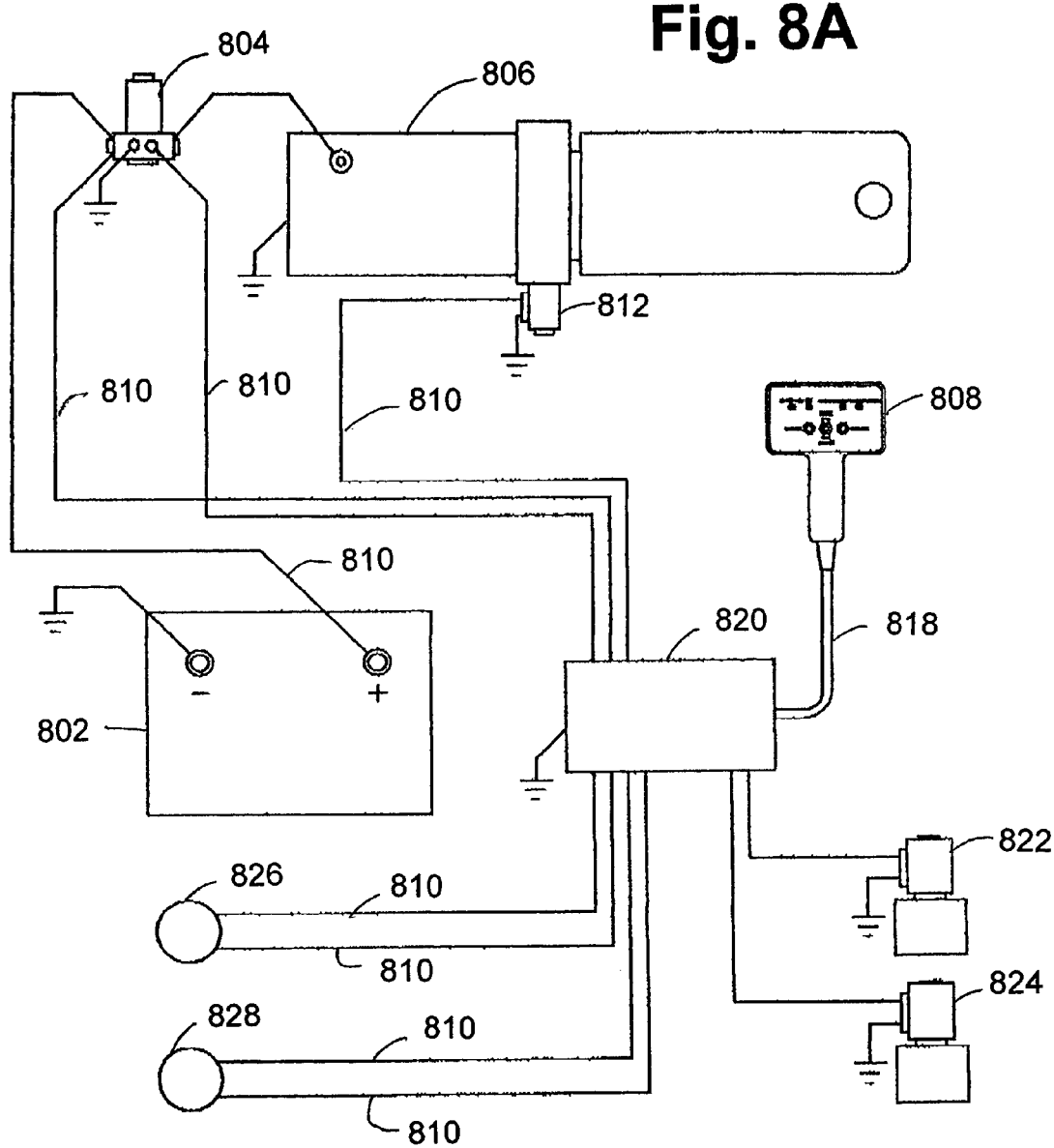
FIG. 8A is an electrical diagram for the inclining and elevating trailer.

FIG. 8A illustrates an electrical diagram for the inclining and elevating trailer. The diagram illustrates a battery 802, a descent solenoid 812, a hydraulic pump and motor assembly 806, a motor relay 804, and a control 808. The diagram also illustrates a first pressure sensor 826, a second pressure sensor 828, an incline solenoid 822, a decline solenoid 824, and a controller or management device 820. The components are operatively connected by wires 810.

The first and second pressure sensors 826, 828 are operatively connected to the inclining and elevating trailer. For example, the first pressure sensor 826 may be located in the front of the trailer and the second pressure sensor 828 may be located in the rear. The management device 820 receives a signal (not shown) from the first and second pressure sensors 826, 828 via the wire 710.

Figure 8B:
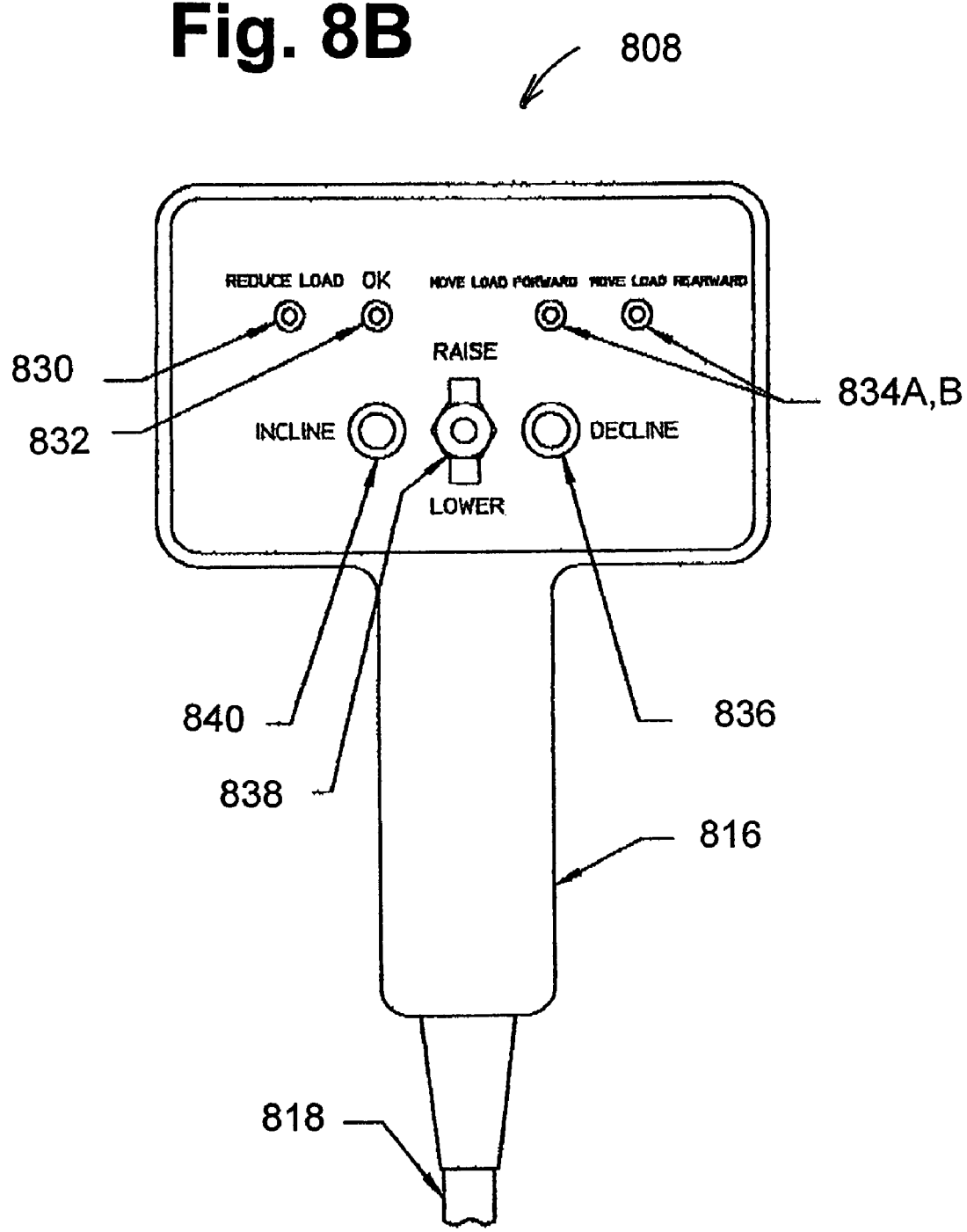
FIG. 8B is a detailed view of the control shown in FIG. 8A.

FIG. 8B provides a detailed view of the control 808. The control 808 includes a handle 816, a harness 818, a pole-switch 838, a first momentary switch 836, and a second momentary switch 840. The harness 818 covers a portion of the wires 810. The control 808 also includes a first light emitting diode (LED) 830, a second LED 832, and third LEDs 834. The LEDs 830, 832, 834 may be of different colors. For example, the first LED 830 may be a red LED, the second LED 832 may be a green LED, and the third LEDs may be yellow.

Based on the signal, the management device 820 selectively operates the LEDs 830, 832, 834. For example, if the first and second pressure sensors 826, 828 indicate that the inclining and elevating trailer is overloaded, then the management device 820 will operate the first LED 830. In a further development of this example, there is a control strategy such that if the trailer is overloaded, then the management device 820 will prevent operation of the trailer. Hence, service life of the trailer will be extended by prevention of trailer overloading. In another example, third LEDs 834 may be operated to indicate which pressure sensor bears a greater load. For instance, if the rear pressure sensor bears a greater load, third LED 834A may be operated, thereby indicating that the load should be moved forward. In contrast, if third LED 834B is operated, then the load should be moved rearward.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example,. Thus, the breadth and scope of the present invention should not be limited by any of the above-described exemplary embodiments, but should be defined only in accordance with the following appended claims.

What is claimed is:

1. An inclining trailer, comprising:
   a. a bed;
   b. a hitch attached to said bed;
   c. a first rotating member having first and second ends, wherein said first rotating member extends horizontally across a portion of the underside of said bed, and wherein said first rotating member is directly pivotally engaged with said bed;
   d. a second rotating member having first and second ends, wherein said second rotating member extends horizontally across a portion of the underside of said bed behind said first rotating member, and wherein said second rotating member is directly pivotally engaged with said bed;
   e. a first support arm having first and second ends, wherein said first support arm first end is affixed to said first rotating member first end adjacent a first side of said bed, and wherein said first support arm second end is in direct pivotal engagement with an axle for a wheel;
   f. a second support arm having first and second ends, wherein said second support arm first end is affixed to said first rotating member second end adjacent a second side of said bed, and wherein said second support arm second end is in direct pivotal engagement with an axle for a wheel;
   g. a third support arm having first and second ends, wherein said third support arm first end is affixed to said second rotating member first end adjacent said first side of said bed, and wherein said third support arm second end is in direct pivotal engagement with an axle for a wheel;
   h. a fourth support arm having first and second ends, wherein said fourth support arm first end is affixed to said second rotating member second end adjacent said second side of said bed, and wherein said fourth support arm second end is in direct pivotal engagement with an axle for a wheel, and wherein said first, second, third, and fourth support arms are configured with respect to said bed so that in a first position said bed is substantially level and in a second position said bed is inclined;
   i. a walking beam having first and second ends, wherein said walking beam first end is pivotally connected to said first support arm;
   j. a connecting link having first and second ends, wherein said connecting link first end is pivotally engaged with said walking beam second end, and wherein said connecting link second end is pivotally engaged with said third support arm; and,
   k. a powered actuator having first and second ends, wherein said powered actuator first end is pivotally engaged with said walking beam between said walking beam first and second ends, wherein said powered actuator second end is pivotally engaged with said bed such that said powered actuator mediates travel of said first, second, third, and fourth support arms between said first and second positions.

2. The trailer according to claim 1 further comprising:
   a. a first wheel assembly operably mounted on said axle engaging said first support arm second end;

b. a second wheel assembly operably mounted on said axle engaging said second support arm second end;

c. a third wheel assembly operably mounted on said axle engaging said third support arm second end; and, d. a fourth wheel assembly operably mounted on said axle engaging said fourth support arm second end.

3. The trailer according to claim 1 wherein said hitch is further defined as a tongue-type hitch.

4. The trailer according to claim 1 wherein said hitch is further defined as a gooseneck-type hitch.

5. The trailer according to claim 1 wherein a portion of said bed opposite said hitch forms a reverse beaver tail.

6. The trailer according to claim 1 wherein said powered actuator is a pneumatic actuator.

7. The trailer according to claim 1 wherein said powered actuator is a linear drive motor.

8. The trailer according to claim 1 wherein said powered actuator is a hydraulic actuator.

9. The trailer according to claim 1 further comprising a hydraulic pump operatively mounted on said bed.

10. The trailer according to claim 1 further comprising:

a. a second walking beam having first and second ends, wherein said second walking beam first end is pivotally connected to said second support arm;

b. a second connecting link having first and second ends, wherein said second connecting link first end is pivotally engaged with said second walking beam second end, and wherein said second connecting link second end is pivotally engaged with said fourth support arm; and c. a second powered actuator having first and second ends, wherein said second powered actuator first end is pivotally connected with said second walking beam between said second walking beam first and second ends, wherein said second powered actuator second end is pivotally engaged with said bed such that said second powered actuator mediates travel of said second and fourth support arms between said first and second positions.

* * * * *